(12) United States Patent
Yuan et al.

(10) Patent No.: US 12,526,813 B2
(45) Date of Patent: Jan. 13, 2026

(54) METHODS OF CONFIGURING GROUP COMMON DCI FOR MU-MIMO

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/796,616

(22) PCT Filed: Apr. 29, 2020

(86) PCT No.: PCT/CN2020/087715
§ 371 (c)(1),
(2) Date: Jul. 29, 2022

(87) PCT Pub. No.: WO2021/217478
PCT Pub. Date: Nov. 4, 2021

(65) Prior Publication Data
US 2023/0138165 A1 May 4, 2023

(51) Int. Cl.
*H04W 72/232* (2023.01)
*H04B 7/0452* (2017.01)
*H04B 7/06* (2006.01)

(52) U.S. Cl.
CPC ...... *H04W 72/232* (2023.01); *H04B 7/06952* (2023.05); *H04B 7/0452* (2013.01)

(58) Field of Classification Search
CPC .. H04W 72/232; H04W 48/12; H04B 7/0452; H04B 7/0617; H04B 7/0695; H04L 5/0091; H04L 5/0048; H04L 5/001; H04L 5/0023; Y02D 30/07
See application file for complete search history.

(56) References Cited

U.S. PATENT DOCUMENTS 9,681,325 B2  6/2017 Chen et al.
11,425,526 B2 * 8/2022 Zhou ................. H04W 4/023
11,617,168 B2  3/2023 Park et al.
(Continued)

FOREIGN PATENT DOCUMENTS

CN   109842869 A   6/2019
CN   110536394 A   12/2019
(Continued)

OTHER PUBLICATIONS

3GPP TS 38.212 (Year: 2020).*
(Continued)

*Primary Examiner* — Mohammad S Anwar
(74) *Attorney, Agent, or Firm* — Procopio, Cory, Hargreaves & Savitch LLP

(57) ABSTRACT

A base station may perform a beamforming for a UE group including UEs that are disposed spatially close to each other for MU-MIMO. The base station may generate group common DCI including a beam indication and/or a PL-RS indication for the UE group. The ID included in the group common DCI may be group specific for the UE group or UE specific for a specific UE. The beam indication for different channels may be indicated by an RNTI or an RRC.

36 Claims, 8 Drawing Sheets

(56) References Cited

U.S. PATENT DOCUMENTS

| | | | | |
|---|---|---|---|---|
| 2012/0314667 | A1* | 12/2012 | Taoka | H04B 7/0452 |
| | | | | 370/329 |
| 2019/0052432 | A1 | 2/2019 | Islam et al. | |
| 2019/0069285 | A1* | 2/2019 | Chandrasekhar | H04W 72/23 |
| 2019/0349904 | A1 | 11/2019 | Kwak et al. | |
| 2020/0100232 | A1 | 3/2020 | Onggosanusi et al. | |
| 2020/0337110 | A1* | 10/2020 | Kim | H04W 76/28 |
| 2021/0337547 | A1* | 10/2021 | Rahman | H04W 72/23 |

FOREIGN PATENT DOCUMENTS

| | | | | |
|---|---|---|---|---|
| CN | 111052809 | A | 4/2020 | |
| EP | 3681211 | A1 | 7/2020 | |
| EP | 3855811 | A1 | 7/2021 | |
| GB | 2562109 | A * | 11/2018 | H04W 72/042 |
| KR | 20200035836 | A | 4/2020 | |
| WO | WO-2013068834 | A1 * | 5/2013 | H04W 72/121 |
| WO | 2015094611 | A1 | 6/2015 | |
| WO | 2019049332 | A1 | 3/2019 | |
| WO | 2020034305 | A1 | 2/2020 | |
| WO | WO-2020063723 | A1 * | 4/2020 | H04L 5/001 |
| WO | 2021076271 | A1 | 4/2021 | |

OTHER PUBLICATIONS

3GPP TS 38.321 (Year: 2020).*
3GPP TS 38.331 (Year: 2020).*
Supplementary European Search Report—EP20933716—Search Authority—The Hague—Jan. 2, 2024.
International Search Report and Written Opinion—PCT/CN2020/087715—ISA/EPO—Jan. 20, 2021.
LG Electronics: "Feature Lead Summary #4 of Enhancements on Multi-beam Operations," 3GPP TSG RAN WG1 Meeting #99, Nov. 18-22, 2019, R1-1913453, 40 pages.
CMCC: "Discussion on UL Inter UE Tx Prioritization/Multiplexing", 3GPP TSG RAN WGI #98, R1-1908868, 3rd Generation Partnership Project, Mobile Competence Centre, 650, Route Des Lucioles, F-06921 Sophia-Antipolis Cedex, France, vol. RAN WG1, No. Prague, CZ, 201 90826-20190830, Aug. 16, 2019, XP051765476, 10 Pages.

* cited by examiner

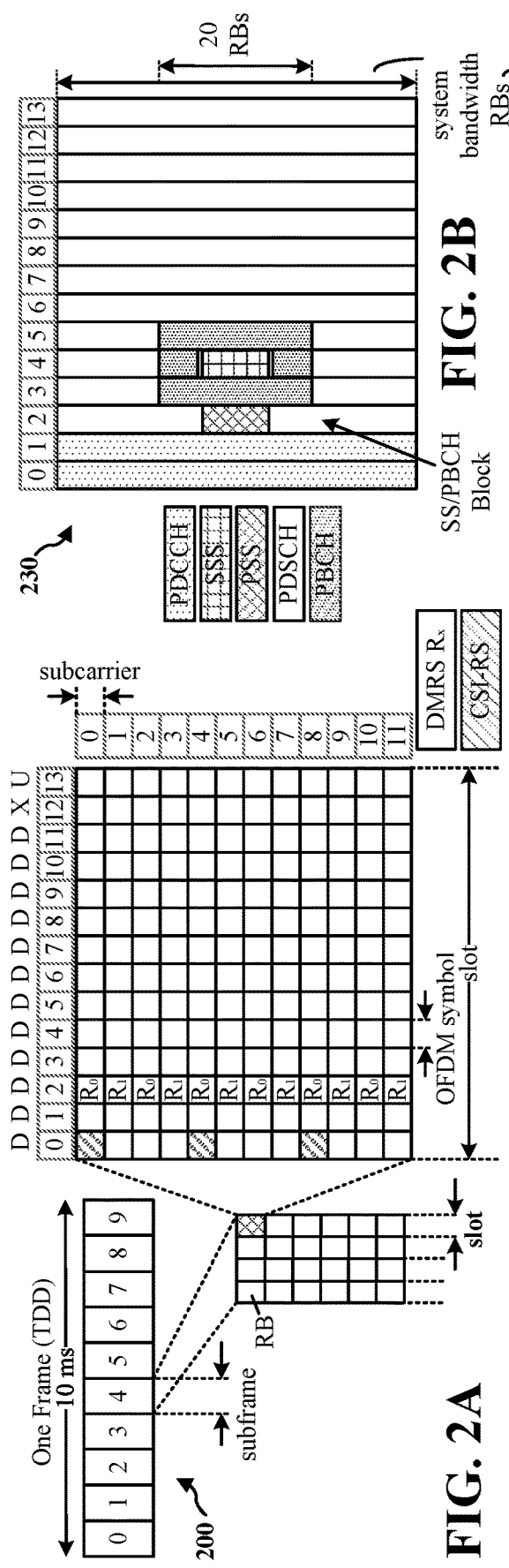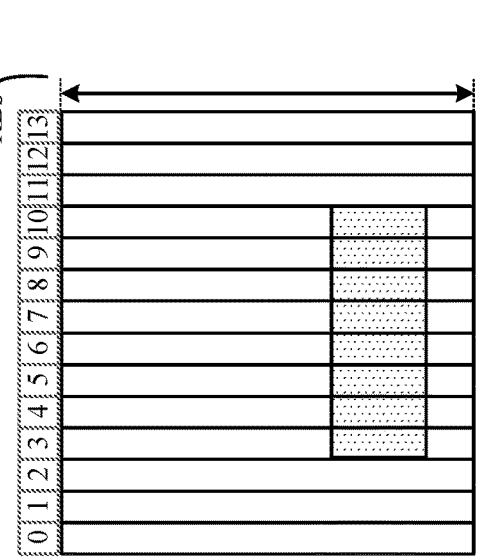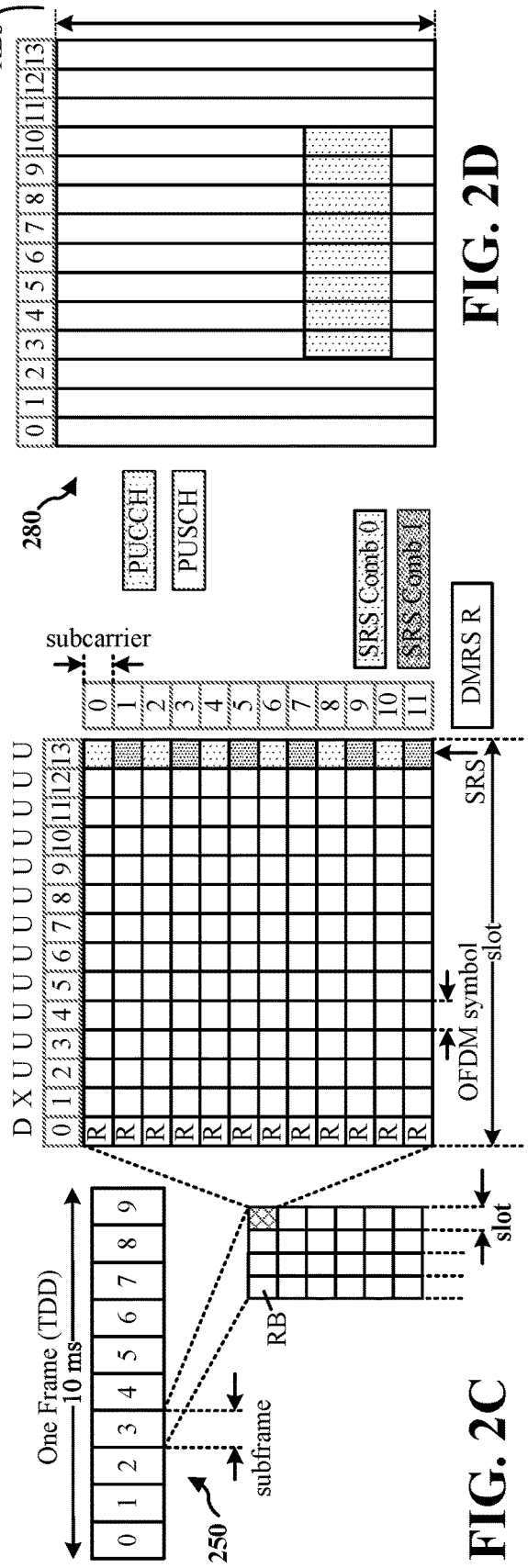
FIG. 2A  FIG. 2B  FIG. 2C  FIG. 2D

METHODS OF CONFIGURING GROUP COMMON DCI FOR MU-MIMO

CROSS REFERENCE TO RELATED APPLICATION(S)

This application is National Stage Application filed under 35 U.S.C. § 371 of PCT International Application Serial No. PCT/CN2020/087715 entitled "METHOD OF CONFIGURING GROUP COMMON DCI FOR MU-MIMO" and filed on Apr. 29, 2020, which is expressly incorporated by reference herein in its entirety.

BACKGROUND

Technical Field

The present disclosure relates generally to communication systems, and more particularly, to a method of configuring a group common downlink control information (DCI) for a multi-user (MU) multiple input and multiple output (MIMO) (MU-MIMO) uplink/downlink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or a base station. The base station may generate and transmit a beamformed signal to a UE group including a group of UEs that are disposed spatially close to each other for MU-MIMO. The base station may generate a group common DCI including a beam indication or a path-loss reference signal (PL-RS) indication for the UE group. The identifier (ID) included in the group common DCI may be group specific for the UE group or UE specific for each UE. The beam indication for different channels may be indicated by a radio network temporary identifier (RNTI) or via a radio resource control (RRC) communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
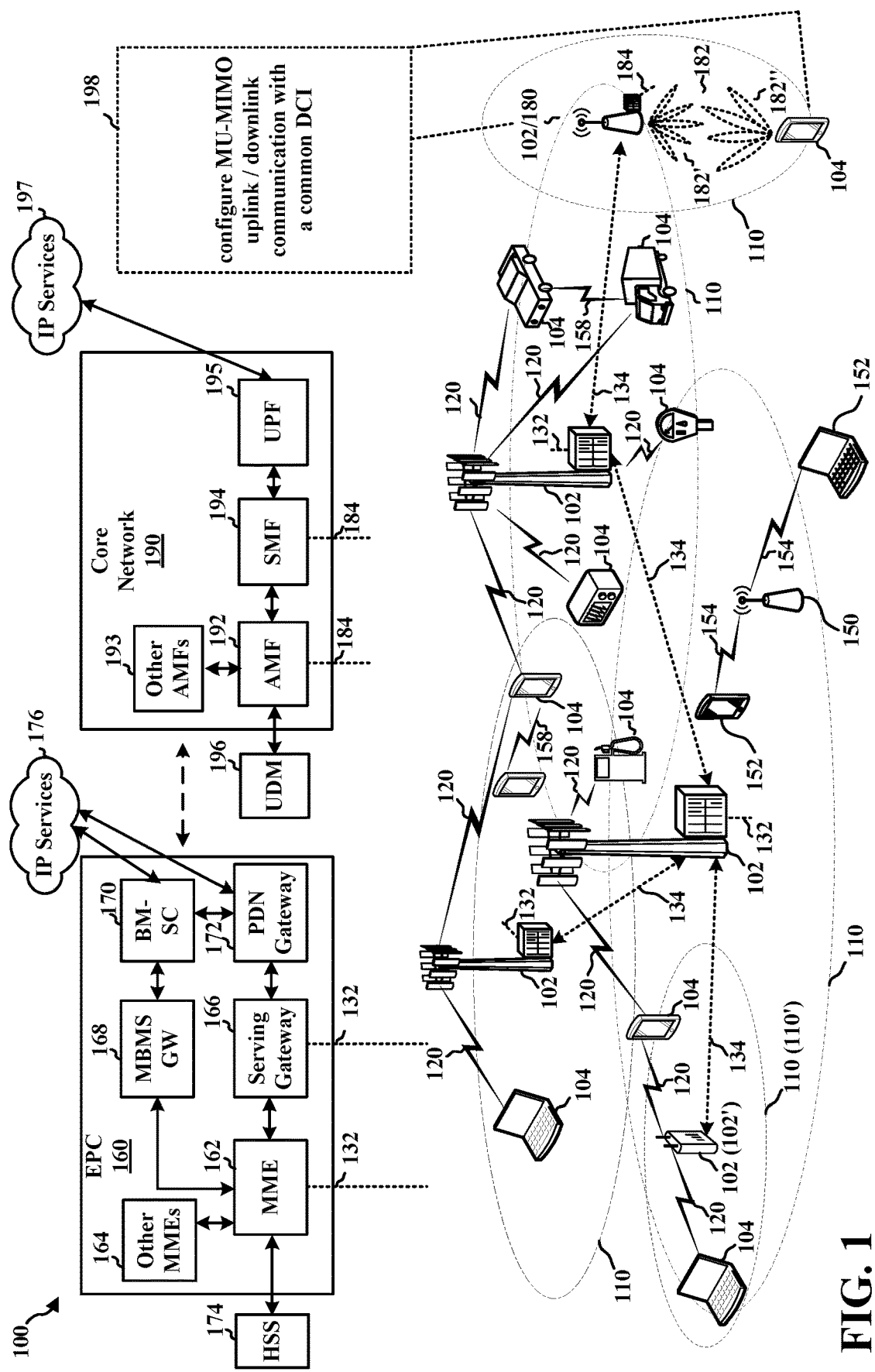
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the base station 102/180 may configure an MU-MIMO uplink/downlink communication with a group common DCI (198) for a UE group including a set of UEs that are disposed spatially close to each other. A base station may generate and transmit a beamformed signal to the UE group including UEs spatially close to each other for MU-MIMO. The base station may generate the group common DCI including a beam indication or a path-loss reference signal (PL-RS) indication for the UE group. The ID included in the group common DCI may be group specific for the UE group or UE specific for a specific UE. The beam indication for different channels may be indicated by the RNTI or via RRC signaling.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through RRC signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
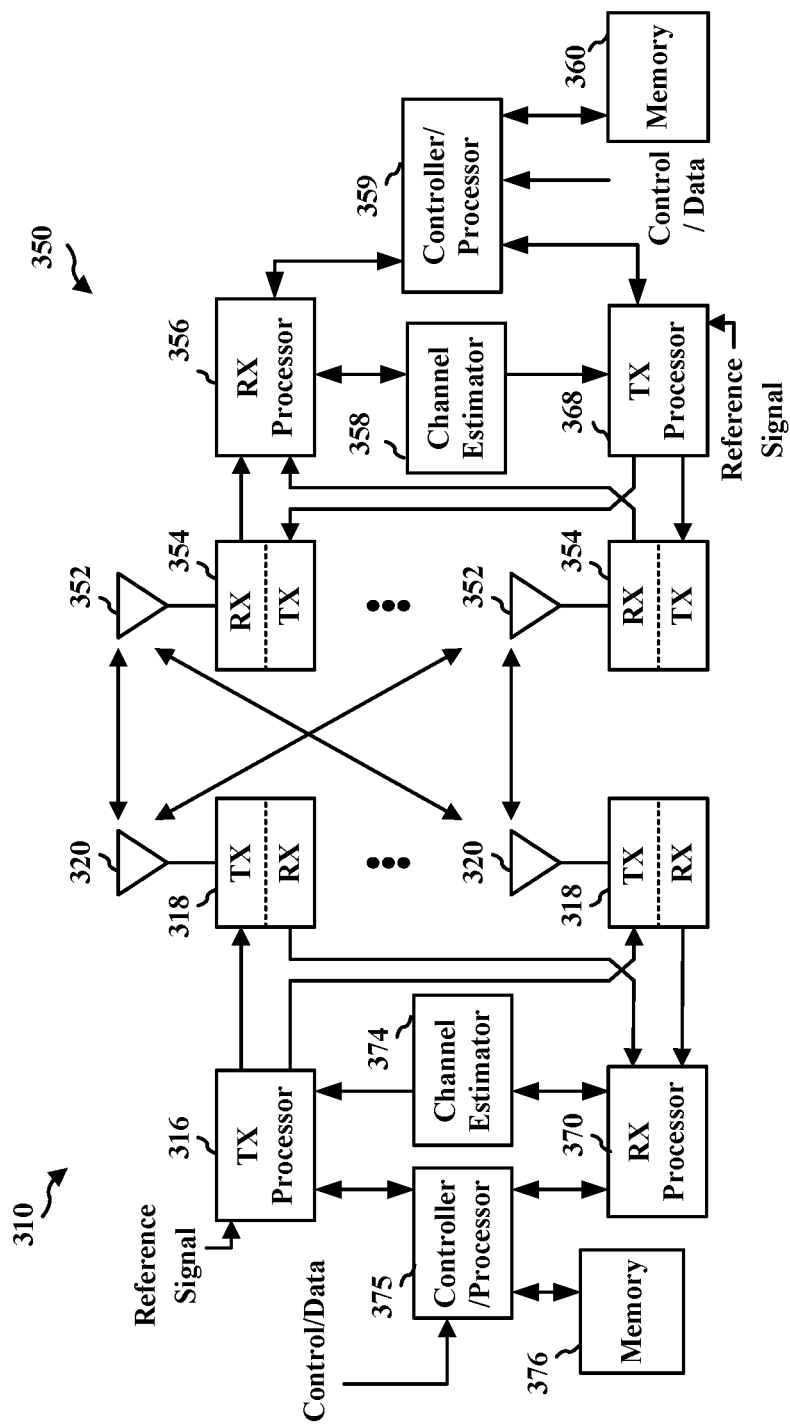
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In certain aspects, the base station 102/180 may transmit a beamformed signal to the UE 104. In one configuration, each beamformed signal may serve multiple UEs, for example, when UEs are densely located within a portion of a coverage area. In such cases the array may be split into multiple sub-arrays for the MU-MIMO. That is, when multiple UEs are disposed spatially close to each other, the base station 180 may generate and transmit a beamformed signal to serve the multiple UEs that are disposed spatially close to each other. For industrial internet-of-things (IoT) (IIoT), a UE may not need a large bandwidth for the UE's payload over the communication link 120. UEs that can be served by the same or close beams may be grouped together and frequency division multiplexed (FDMed) so as to save spatial dimensions for multiplexing other UEs in different directions. That is, since the communication associated the IIoT generally does not require a heavy payload, the base station may FDM the communication for the UE group, such as multiple UEs that are disposed spatially close, into the same beam formed signal or close beam formed signals to reserve the resources of the base station for communicating with other UEs in different directions. Grouping of spatially close UEs may also be attractive in the case of multiple beam sweeps because the multiple beam sweeps can be swept altogether as a group. Group formation can be updated based on UE and environmental mobility. That is, the base station may receive access the information gathered, and based on the assessment of the communication environment, the base station may dynamically or semi-statically update the UE groups. Grouping of the UEs may reduce the beam measuring and reporting overhead incurred by the base station and the UEs, for example. in cases such as a vehicle platooning. Grouping of the UEs may also reduce the beam sweep signaling overhead.

The DCI may include cyclic redundancy check (CRC) parity bits. The base station may scramble the DCI including the CRC parity bits by the RNTI. The UE may receive the DCI and descramble the scrambled DCI using the RNTI of the UE. The UE may check if there is a CRC parity error to determine whether the received DCI is for the payload of the UE. Particularly, the UE may compute the CRC of the payload and compare that with the CRC transmitted with the payload to determine if an error occurred. In case the CRC of the DCI descrambled using the RNTI of the UE matches the CRC, the UE may determine that the descrambled DCI is directed to the UE, and the UE may schedule the communication channel with the base station according to the indication of the corresponding DCI. The DCI format 2_x may be used for a group of UEs, and the RNTI may also be shared by the group of UEs. The shared RNTI may include an indication such as a transmit power control (TPC)-PUCCH-RNTI (TPC-PUCCH-RNTI), or a TPC-PUSCH-RNTI. DCI format 2_x may include multiple indication blocks, such as block number 1, block number 2, . . . , block number N. The starting bit of each indication block (or block) may be indicated by RRC signaling, and the applicable serving cell may be RRC configured. That is, when the DCI and the RNTI are shared for the UE group, the DCI indication block indicated by the RRC signaling may be for each UE of the group of UEs. Accordingly, each indication block of the DCI according to the DCI format 2_x may include the ID of the DCI for each UE of the group of UEs. For example, when a group of UEs include four UEs (for example, UE1, UE2, UE3, and UE4), the format 2_x DCI for the group of UEs may include the indication blocks Block 0, Block 1, Block 2, and Block 3, as schematically illustrated in the Table 1 below. For another example, each block may include an ID for the UE1, the UE2, the UE3, and the UE4, respectively, as schematically illustrated in the Table 2 below.

TABLE 1 an example of a UE specific format 2_x DCI

| Block 0 | Block 1 | Block2 | Block 3 | Block 4 | Block 5 | Block 6 | Block 7 |
|---------|---------|--------|---------|---------|---------|---------|---------|
| ↓ UE1   | ↓ UE2   | ↓ UE3  | ↓ UE4   |         |         |         |         |

TABLE 2 an example of a UE group specific format 2_x DCI

| Block 0 | Block 1 | Block 2 | Block 3 | Block 4 | Block 5 | Block 6 | Block 7 |
|---------|---------|---------|---------|---------|---------|---------|---------|
| ↑ UE group 1 | ↓ UE group 2 | ↑ UE group 3 | ↓ UE group 4 | | | | |

In one configuration, a group common DCI may be used to indicate information for a group of UEs. The group common DCI may include the beam indication and the PL-RS indication. The indicated IDs may be UE specific, or group common. Also, the same RNTI or different RNTIs may be used in the group common DCI to indicate different information for a group of UEs. The UE and the UE groups may determine which ID is directed to the channel of the UE and the UE groups by RRC signaling.

Figure 4:
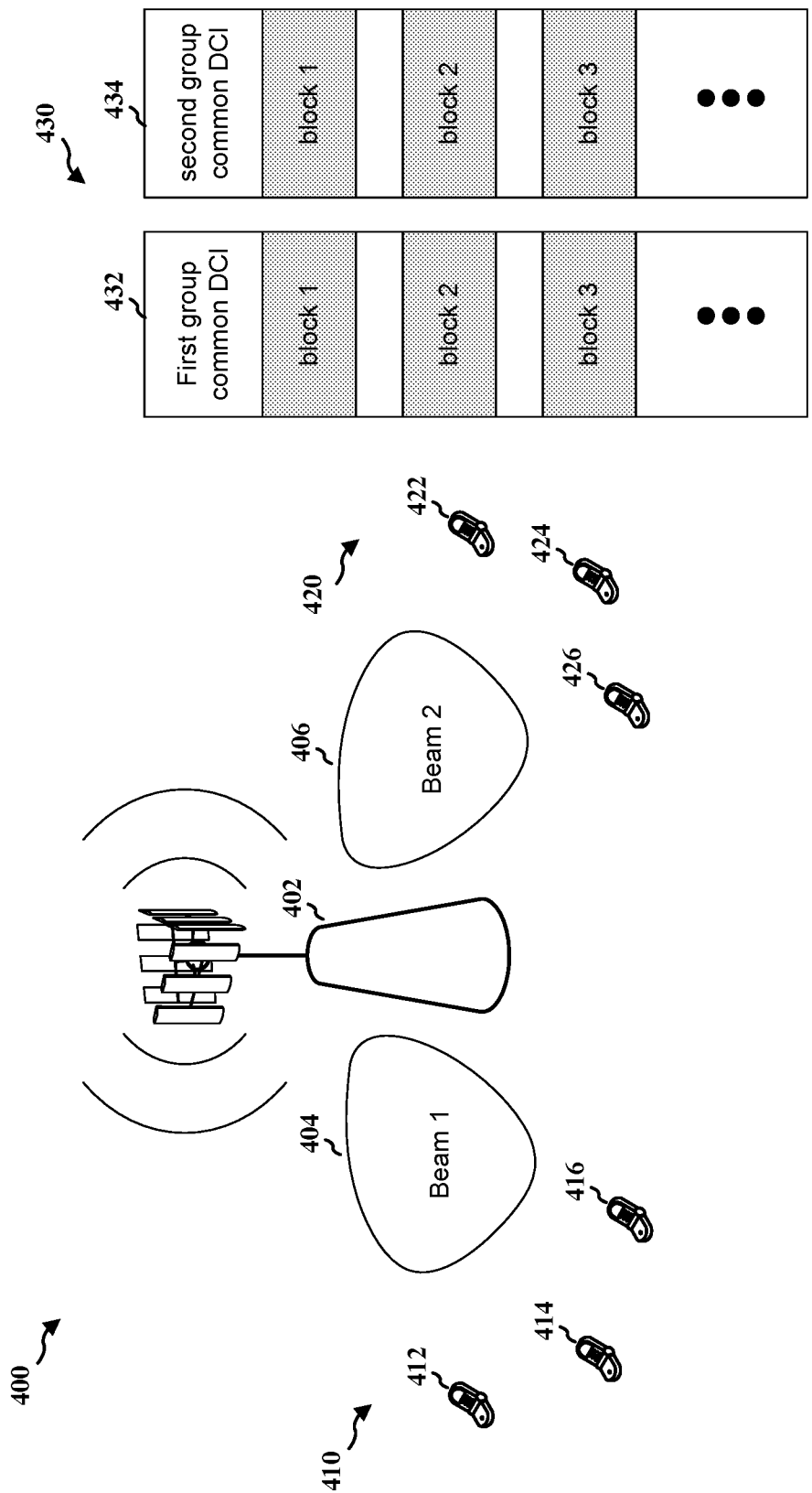
FIG. 4 is a diagram illustrating configuration of the group common DCI for the MU-MIMO communication.

FIG. 4 is a diagram 400 illustrating two configurations of the group common DCI 430 for the MU-MIMO communication. In one configuration, the base station 402 may communicate with the UEs 412, 414, 416, 422, 424, and 426. The base station 402 may assess the communication environment, and group the UEs to form a first UE group 410 including UEs 412, 414, and 416 and a second UE group 420 including UEs 422, 424, and 426. The base station 402 and the first UE group 410 may communicate through a first beamformed signal 404, and the base station 402 and the second UE group 420 may communicate through a second beamformed signal 406. The base station 402 may generate a first group common DCI 432 including a number of indication block for the first UE group 410 including UEs 412, 414, and 416, and a second group common DCI 434 including a number of indication block for the second UE group 420 including UEs 422, 424, and 426.

Figure 5:
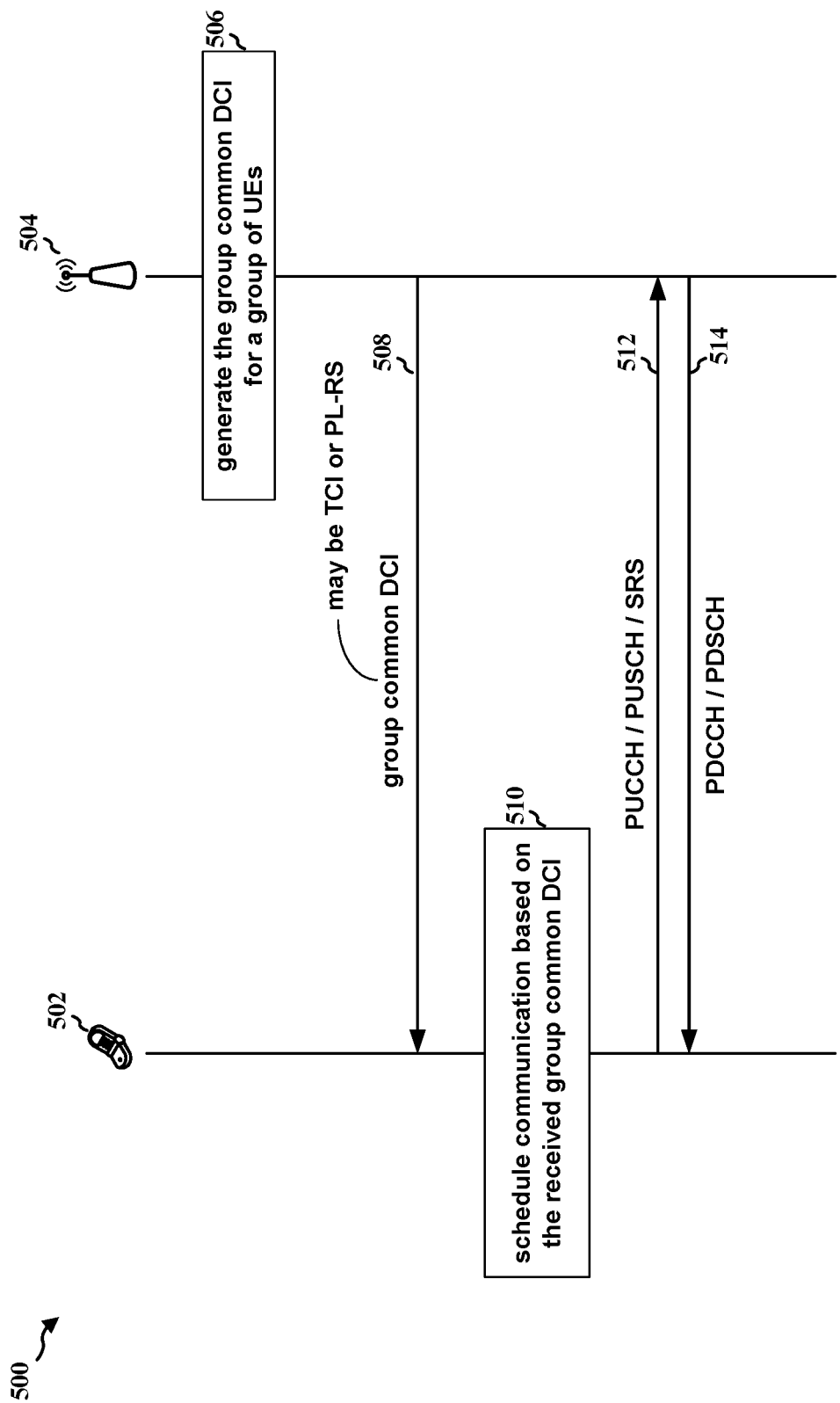
FIG. 5 is a call diagram illustrating configuration of the group-common DCI for MU-MIMO wireless communication between the base station and the UE.
Figure 6:
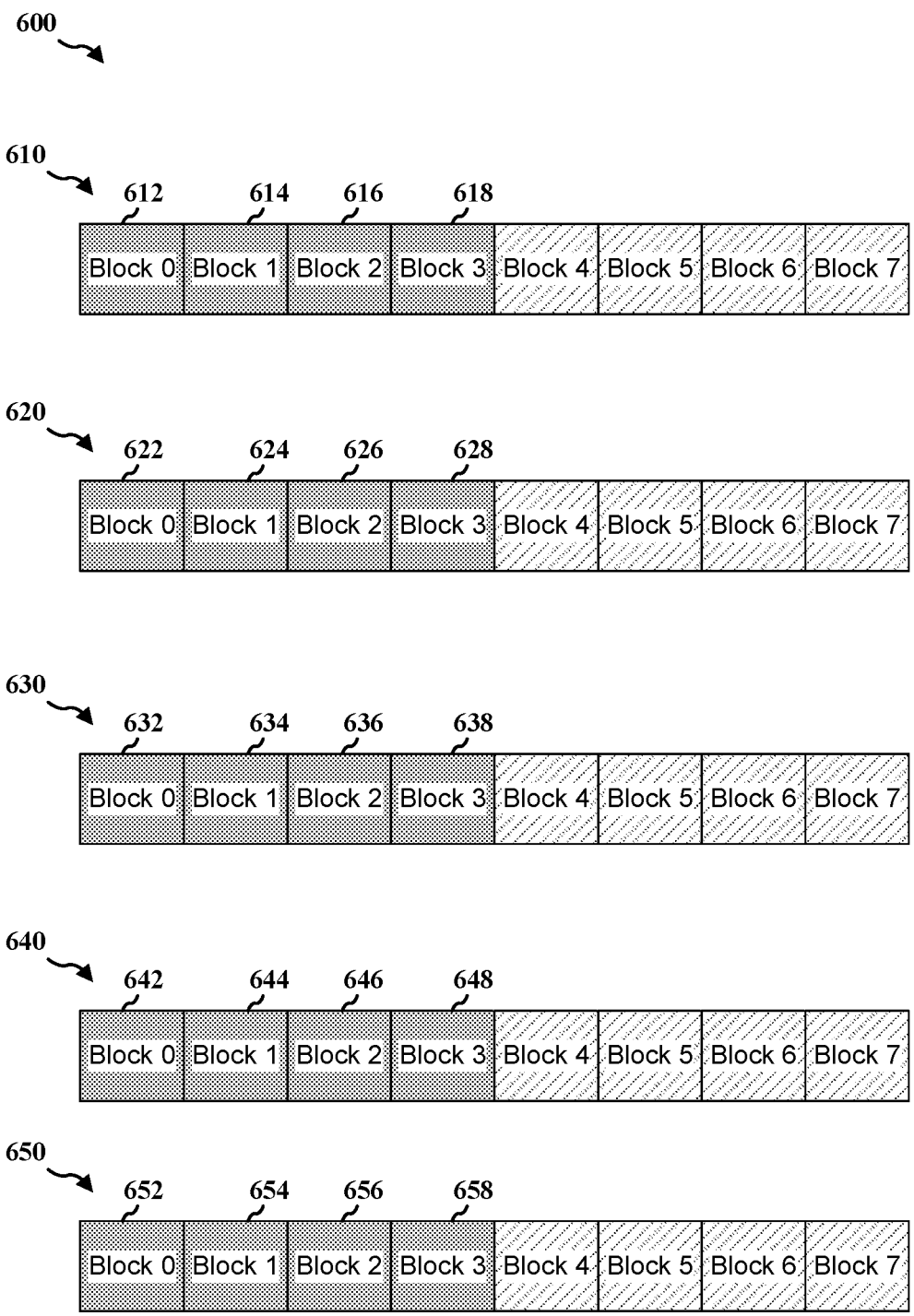
FIG. 6 is a set of diagrams illustrating the group-common DCI including resource blocks.

FIG. 5 is a call diagram 500 illustrating the configuration procedure when a group-common DCI is employed in MU-MIMO wireless communication between the base station and the UE. FIG. 6 is a set of diagrams 600 illustrating the indication blocks of the group-common DCI.

Referring back to FIG. 5, in a MU-MIMO communication environment, the base station 504 may generate a group common DCI for a UE group of multiple UEs, including the UE 502, which are spatially close to each other. The base station may generate and transmit a beam formed signal to serve the UE group including the UE 502. The base station 504 may generate the group common DCI 506 for the UE group including the UE 502, and transmit the group common DCI 508 to the UE group including the UE 502. The UE 502 may receive the group common DCI from the base station 504. In response to the group common DCI received from the base station 504, the UE 502 may schedule the communication with the base station 504 based on the received group common DCI 510.

In one configuration, the group common DCI may include a beam indication for a UE group or a PL-RS indication for the UE group. When the group common DCI includes a PL-RS, the PL-RS may include a synchronization signal block (SSB) or a CSI-RS. The UE 502 may receive the group common DCI at 508. When the group common DCI includes the PL-RS which in turn includes the SSB or the CSI-RS identifier, the UE may schedule the uplink connection with the base station 504 which may include the PUCCH/PUSCH/SRS 512. Alternatively, the group common DCI may have a beam indication, such as a transmission configuration indicator (TCI) which can be referred to the RS. The TCI may include the indication of a CSI-RS, SSB, or SRS. That is, the beam indication, which may also be referred to as the TCI, may be the RS that includes the indication of the CSI-RS, SSB, or SRS (refer to FIG. 2A). When the UE 502 receives a group common DCI indicating the beam indication, the UE 502 may schedule the uplink connection with the base station 504 including the PUCCH/PUSCH/SRS 512 or may schedule the downlink connection with the base station 504 including the PDCCH/PDSCH 514.

Referring to FIG. 6, in one configuration, the group common DCI 610 may include the ID, such as an RS ID, a bandwidth part (BWP) ID (BWP ID), and a component carrier (CC) ID (CC ID). The ID may be identical for multiple UEs and the indication is signaled on a per UE group basis, one block for a UE group. That is, the ID may be configured to be specific to the UE group, and the multiple UEs of the UE group may share the identical ID. For example, the ID of the block 0 612 of the group common DCI 610 may be specifically configured for a first UE group, the ID of the block 1 614 of the group common DCI 610 may be specifically configured for a second UE group, the ID of the block 2 616 of the group common DCI 610 may be specifically configured for a third UE group, and the ID of the block 3 618 of the group common DCI 610 may be specifically configured for a third UE group. In another example, the ID may be UE specific, and the indication may be signaled on a per UE basis, one block for each UE. That is, the ID may be configured to be specific to each UE of the UE group. For example, the ID of the block 0 612 of the group common DCI 610 may be specifically configured for a first UE, the ID of the block 1 614 of the group common DCI 610 may be specifically configured for a second UE, the ID of the block 2 616 of the group common DCI 610 may be specifically configured for a third UE, and the ID of the block 3 618 of the group common DCI 610 may be specifically configured for a fourth UE.

The base station 504 and the UE group including the UE 502 may have various configurations for the RNTI used to descramble the CRC bits of the DCI. In one configuration, different RNTI may be configured for applying different indications for different channels. That is, the RNTI may be configured differently for various channels. For example, the RNTI may include TCI-PDCCH-RNTI, TCI-PDSCH-RNTI, TCI-PUCCH-RNTI, and TCI-PUSCH-RNTI for the PDCCH, the PDSCH, the PUCCH and the PUSCH, respectively. Also, the RNTI may include TCI-DL-RNTI, TCI-UL-RNTI for the downlink connection and the uplink connection, respectively. That is, the RNTI may be configured to include the TCI-PDCCH-RNTI which is the RNTI for the beam indication for the PDCCH, the TCI-PDSCH-RNTI which is the RNTI for the beam indication for the PDSCH, the TCI-PUCCH-RNTI which is the RNTI for the beam indication for the PUCCH, and the TCI-PUSCH-RNTI which is the RNTI for the beam indication for the PUSCH. The RNTI may be configured to include the TCI-DL-RNTI which is the RNTI for the beam indication for the downlink channels, and the TCI-UL-RNTI which is the RNTI for the beam indication for the uplink channels.

Also, same RNTI may be configured using RRC signal to apply different indication for different channels. That is, for the DCI using the same RNTI to descramble the CRC bits of the DCI, different indications for different channels may be configured using RRC signaling. For example, the RRC may be configured to indicate that blocks i+1 through i+4 of the DCI are TCI indications for the PDCCH, the PDSCH, the PUCCH, and the PUSCH respectively. In another example, the RRC may be configured to indicate that blocks i+1 and i+2 of the DCI are TCI indications for specific downlink channels and/or uplink channels.

Referring to FIG. 6, in one configuration, the DCI 620 may include TCI indications for the PDCCH, and the DCI 620 may be configured using the TCI-PDCCH-RNTI. Accordingly, the RRC configuration of the DCI 620 may indicate that each block is allocated for the ID of a respective UE or for a respective UE group. In an example, for the DCI 620 configured using the TCI-PDCCH-RNTI, the RRC may be configured as UE specific, and each indication block of the indication blocks indicates an ID of the TCI for the PDCCH for each UE. In other words, the block 0 622 may include the TCI ID for the PDCCH for a first UE, the block 1 624 may include the TCI ID for the PDCCH for a second UE, the block 2 626 may include the TCI ID for the PDCCH for a third UE, and the block 3 628 may include the TCI ID for the PDCCH for a fourth UE. In another example, the RRC may be configured as UE group specific, and each indication block of the indication blocks indicates a TCI ID for the PDCCH for each UE group. In other words, the block 0 622 may include the TCI ID for the PDCCH for a first UE group, the block 1 624 may include the TCI ID for the PDCCH for a second UE group, the block 2 626 may include the TCI ID for the PDCCH for a third UE group, and the block 3 628 may include the TCI ID for the PDCCH for a fourth UE group.

In one configuration, the DCI 630 may include the TCI indication for the PUCCH, and therefore, the DCI 630 may be configured using the TCI-PUCCH-RNTI. Accordingly, the RRC configuration of the DCI 630 may indicate that each block indicates an ID for each UE or an ID for each UE group. In an example, for the DCI 630 configured using the TCI-PUCCH-RNTI, the RRC may be configured as UE specific, and each of the indication blocks indicates a TCI ID for the PUCCH for each UE. In other words, the block 0 632 may include the TCI ID for the PUCCH for a first UE, the block 1 634 may include the TCI ID for the PUCCH for a second UE, the block 2 636 may include the TCI ID for the PUCCH for a third UE, and the block 3 638 may include the TCI ID for the PUCCH for a fourth UE. In another example, the RRC may be configured as UE group specific, and each of the indication blocks indicates a TCI ID for the PUCCH for each UE group. In other words, the block 0 632 may include the TCI ID for the PUCCH for a first UE group, the block 1 634 may include the TCI ID for the PUCCH for a second UE group, the block 2 636 may include the TCI ID for the PUCCH for a third UE group, and the block 3 638 may include the TCI ID for the PUCCH for a fourth UE group.

In one configuration, the DCI 640 may include TCI indications for the downlink communication, and therefore, the DCI 640 may be configured using the TCI-DL-RNTI. Accordingly, the RRC configuration of the DCI 640 may indicate that each block of the allocated blocks indicates an ID for different downlink channels. For example, when the DCI 640 is configured using the TCI-DL-RNTI, the RRC may be configured as UE specific, and each block of the indication blocks indicates a TCI ID for the downlink channels. In other words, the block 0 642 may include the TCI ID for the PDCCH, and the block 1 644 may include the TCI ID for the PDSCH.

In one configuration the DCI 650 may include TCI indications for the uplink communication, and therefore, the DCI 650 may be configured using the TCI-UL-RNTI. Accordingly, the RRC configuration of the DCI 650 may indicate that each block of the allocated blocks indicates an ID for each different uplink channel. For example, for the DCI 650 configured using the TCI-UL-RNTI, the RRC may be configured as UE specific, and each block of the allocated indication blocks indicates a TCI ID for the downlink channels. In other words, the block 0 652 may include the TCI ID for the PUCCH, and the block 1 654 may include the TCI ID for the PUSCH.

Figure 7:
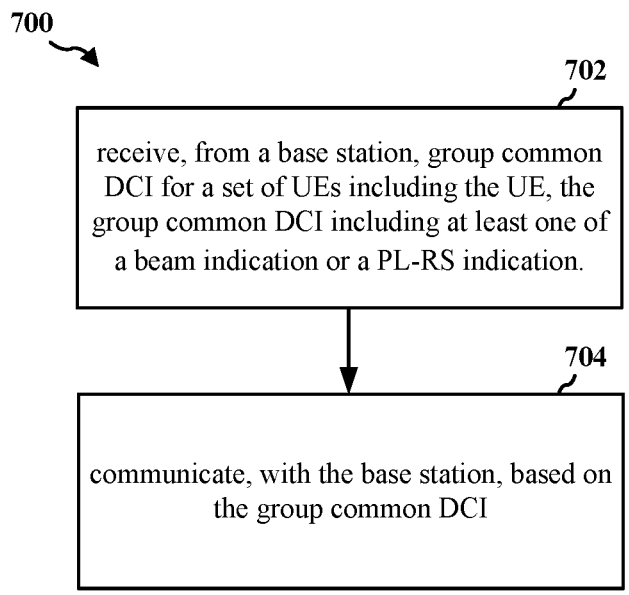
FIG. 7 is a flowchart of the method of wireless communication of the UE with the group common DCI.

FIG. 7 is a flowchart 700 of the method of wireless communication employing a group common DCI. The method may be performed by a UE (e.g., the UE 104/502, which may include the memory 360 and which may be the entire UE 104/502 or a component of the UE 104/502, such as the TX processor 368, the RX processor 356, and/or the controller/processor 359). At 702, the UE may be configured to receive the group common DCI from the base station. The group common DCI may be configured for a set of UEs by the base station, and the set of UEs may include the UE. The group common DCI may include the beam indication and/or the PL-RS indication. At 704, in response to receiving the group common DCI, the UE may be configured to communicate with the base station, based on the group common DCI.

Figure 8:
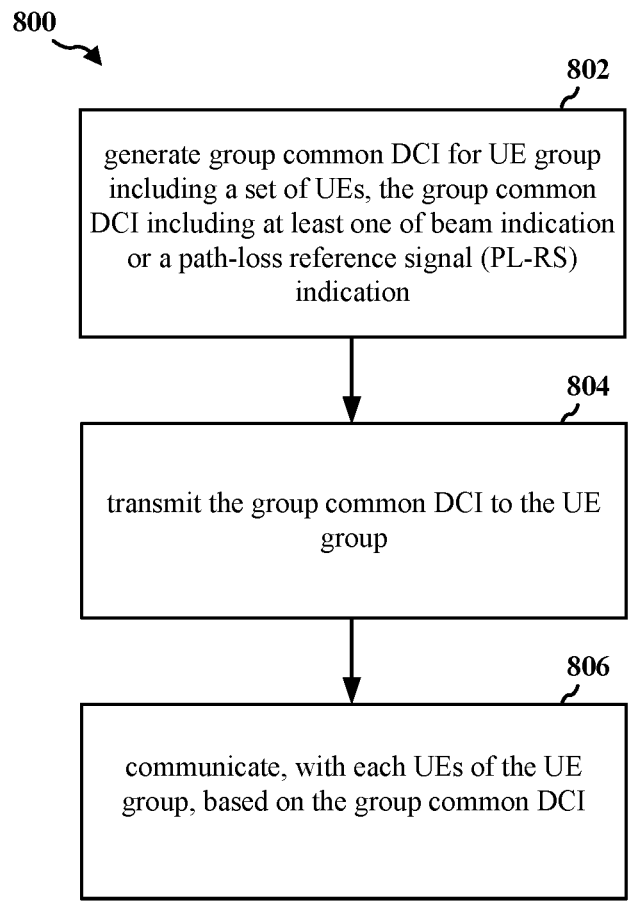
FIG. 8 is a flowchart of the method of wireless communication of the base station with the group common DCI.

FIG. 8 is a flowchart 800 of the method of wireless communication with the group common DCI. The method may be performed by a base station (e.g., the base station 102/180/504, which may include the memory 376 and which may be the entire base station 102/180/504 or a component of the base station 102/180/504, such as the TX processor 316, the RX processor 370, and/or the controller/processor 375). The base station 102/180/504 may group UEs based on spatial proximity, and determine the number of groups. At 802, the base station 102/180/504 may be configured to generate a group common DCI for a UE group, the UE group including a set of UEs. The base station 102/180/504 may allocate blocks of the group-common DCI for the respective UEs or UE groups, and assign the IDs for each of the UEs or the UE groups and insert the IDs into the allocated blocks of the group-common DCI. The group common DCI may include the beam indication and/or the PL-RS indication. At 804, the base station may be configured to transmit the group common DCI to the UE group including the set of UEs. At 806, the base station is configured to communicate with each of the UEs of the UE group based on the group common DCI.

Referring again to FIGS. 4, 5, 6, 7, and 8, as discussed above, in the MU-MIMO communication environment, the group common DCI can be used to indicate information for the group of UEs. The use of same or close beam formed signal for the UEs grouped together may reduce the beam measuring and reporting overhead, and may also reduce the beam sweeping signal overhead. The base station 102/180/504 may be configured to generate and transmit the group common DCI for a UE group including multiple UEs disposed spatially close to each other. The UE 104/502 may receive the group common DCI and schedule communication with the base station 102/180/504 based on the received group common DCI. The group common DCI may include beam indication and/or PL-RS indication. The indicated identifiers can be UE specific, or group common. Also, same or different RNTI may be used in the group common DCI to indicate different information for the group of UEs. Particularly, the group common DCI may include the PL-RS indication for transmitting the PUCCH, the PUSCH, and/or the SRS, and the PL-RS may include the SSB and/or the CSI-RS. The beam indication, or the TCI, may be for receiving the PDCCH and/or the PDSCH, and may also be for transmitting the PUCCH, the PUSCH, and/or the SRS. The group common DCI includes IDs, and the IDs may be group specific or UE specific. The beam indication for different channels or a set of channels is indicated by different RNTI and the RRC configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, from a base station, group common downlink control information (DCI), the group common DCI being for a set of UEs, the set of UEs including the UE, the group common DCI including:
      at least one of a beam indication or a path-loss reference signal (PL-RS) indication; and
      at least one identifier (ID) embedded within the DCI, the ID being for multi-user (MU) multiple input and multiple output (MIMO) (MU-MIMO) communication and corresponding to a specific group of UEs or a specific UE, wherein the specific group of UEs or the specific UE is based on a spatial proximity of the specific UE or UEs in the specific group of UEs; and
   communicating, with the base station, based on the group common DCI.

2. The method of claim 1, wherein the group common DCI comprises the PL-RS indication for transmitting at least one of a physical uplink control channel (PUCCH), a physical uplink shared channel (PUSCH), or sounding reference signal (SRS).

3. The method of claim 2, wherein the PL-RS comprises one of a synchronization signal block (SSB) or channel state information (CSI) reference signal (RS) (CSI-RS).

4. The method of claim 1, wherein the group common DCI comprises the beam indication for receiving at least one of a physical downlink control channel (PDCCH) or a physical downlink shared channel (PDSCH), or transmitting at least one of a physical uplink control channel (PUCCH), a physical uplink shared channel (PUSCH), or sounding reference signal (SRS).

5. The method of claim 4, wherein the beam indication comprises a transmission configuration indicator (TCI).

6. The method of claim 1, wherein the at least one of the beam indication or the PL-RS is indicated in the group common DCI for a group of UEs when the at least one ID is group specific, the group of UEs corresponding to the at least one ID.

7. The method of claim 1, wherein the at least one of the beam indication or the PL-RS is indicated in the group common DCI for each UE of the set of UEs when the at least one ID is UE specific, the set of UEs corresponding to the at least one ID.

8. The method of claim 1, wherein the beam indication for each different channel or for a set of channels is indicated by a different radio network temporary identifier (RNTI).

9. The method of claim 8, wherein the beam indication for the each different channels or the set of channels is further indicated through a radio resource control (RRC) configuration.

10. An apparatus for wireless communication, the apparatus being a user equipment (UE), comprising:
    memory; and
    at least one processor coupled to the memory and configured to:
    receive, from a base station, group common downlink control information (DCI), the group common DCI being for a set of UEs, the set of UEs including the UE, the group common DCI including:
       at least one of a beam indication or a path-loss reference signal (PL-RS) indication; and
       at least one identifier (ID) embedded within the DCI, the ID being for multi-user (MU) multiple input and multiple output (MIMO) (MU-MIMO) communication and corresponding to a specific group of UEs or a specific UE, wherein the specific group of UEs or the specific UE is based on a spatial proximity of the specific UE or UEs in the specific group of UEs; and
    communicate, with the base station, based on the group common DCI.

11. The apparatus of claim 10, wherein the group common DCI comprises the PL-RS indication for transmitting at least one of a physical uplink control channel (PUCCH), a physical uplink shared channel (PUSCH), or sounding reference signal (SRS).

12. The apparatus of claim 11, wherein the PL-RS comprises one of a synchronization signal block (SSB) or a channel state information (CSI) reference signal (RS) (CSI-RS).

13. The apparatus of claim 10, wherein the group common DCI comprises the beam indication for receiving at least one of a physical downlink control channel (PDCCH) or a physical downlink shared channel (PDSCH), or transmitting at least one of a physical uplink control channel (PUCCH), a physical uplink shared channel (PUSCH), or sounding reference signal (SRS).

14. The apparatus of claim 13, wherein the beam indication comprises a transmission configuration indicator (TCI).

15. The apparatus of claim 10, wherein the at least one of the beam indication or the PL-RS is indicated in the group common DCI for a group of UEs when the at least one ID is group specific, the group of UEs corresponding to the at least one ID.

16. The apparatus of claim 10, wherein the at least one of the beam indication or the PL-RS is indicated in the group common DCI for each UE of the set of UEs when the at least one ID is UE specific, the set of UEs corresponding to the at least one ID.

17. The apparatus of claim 10, wherein the beam indication for each different channel or for a set of channels is indicated by a different radio network temporary identifier (RNTI).

18. The apparatus of claim 17, wherein the beam indication for the each different channel or for the set of channels is further indicated through a radio resource control (RRC) configuration.

19. An apparatus for wireless communication, the apparatus being a user equipment (UE), comprising:
    means for receiving, from a base station, group common downlink control information (DCI), the group common DCI being for a set of UEs, the set of UEs including the UE, the group common DCI including:

at least one of a beam indication or a path-loss reference signal (PL-RS) indication; and at least one identifier (ID) embedded within the DCI, the ID being for multi-user (MU) multiple input and multiple output (MIMO) (MU-MIMO) communication and corresponding to a specific group of UEs or a specific UE, wherein the specific group of UEs or the specific UE is based on a spatial proximity of the specific UE or UEs in the specific group of UEs; and means for communicating, with the base station, based on the group common DCI.

20. The apparatus of claim 19, wherein the group common DCI comprises the PL-RS indication for transmitting at least one of a physical uplink control channel (PUCCH), a physical uplink shared channel (PUSCH), or sounding reference signal (SRS).

21. The apparatus of claim 20, wherein the PL-RS comprises one of a synchronization signal block (SSB) or a channel state information (CSI) reference signal (RS) (CSI-RS).

22. The apparatus of claim 19, wherein the group common DCI comprises the beam indication for receiving at least one of a physical downlink control channel (PDCCH) or a physical downlink shared channel (PDSCH), or transmitting at least one of a physical uplink control channel (PUCCH), a physical uplink shared channel (PUSCH), or sounding reference signal (SRS).

23. The apparatus of claim 22, wherein the beam indication comprises a transmission configuration indicator (TCI).

24. The apparatus of claim 19, wherein the at least one of the beam indication or the PL-RS is indicated in the group common DCI for a group of UEs when the at least one ID is group specific, the group of UEs corresponding to the at least one ID.

25. The apparatus of claim 19, wherein the at least one of the beam indication or the PL-RS is indicated in the group common DCI for each UE of the set of UEs when the at least one ID is UE specific, the set of UEs corresponding to the at least one ID.

26. The apparatus of claim 19, wherein the beam indication for each different channel or for a set of channels is indicated by a different radio network temporary identifier (RNTI).

27. The apparatus of claim 26, wherein the beam indication for the each different channel or for the set of channels is further indicated through a radio resource control (RRC) configuration.

28. An apparatus for wireless communication, the apparatus being a base station, comprising:
memory; and
at least one processor coupled to the memory and configured to:

generate group common downlink control information (DCI) for a user equipment (UE) group, the UE group including a set of UEs, the group common DCI including:

at least one of a beam indication or a path-loss reference signal (PL-RS) indication; and at least one identifier (ID) embedded within the DCI, the ID being for multi-user (MU) multiple input and multiple output (MIMO) (MU-MIMO) communication and corresponding to a specific group of UEs or a specific UE, wherein the specific group of UEs or the specific UE is based on a spatial proximity of the specific UE or UEs in the specific group of UEs;

transmit the group common DCI to the UE group including the set of UEs; and communicate, with each UE of the UE group, based on the group common DCI.

29. The apparatus of claim 28, wherein the group common DCI comprises the PL-RS indication for receiving at least one of a physical uplink control channel (PUCCH), a physical uplink shared channel (PUSCH), or sounding reference signal (SRS).

30. The apparatus of claim 29, wherein the PL-RS comprises one of a synchronization signal block (SSB) or a channel state information (CSI) reference signal (RS) (CSI-RS).

31. The apparatus of claim 28, wherein the group common DCI comprises the beam indication for transmitting at least one of a physical downlink control channel (PDCCH) or a physical downlink shared channel (PDSCH), or receiving at least one of a physical uplink control channel (PUCCH), a physical uplink shared channel (PUSCH), or sounding reference signal (SRS).

32. The apparatus of claim 31, wherein the beam indication comprises a transmission configuration indicator (TCI).

33. The apparatus of claim 28, wherein the at least one of the beam indication or the PL-RS is indicated in the group common DCI for a group of UEs when the at least one ID is group specific, the UE group corresponding to the at least one ID.

34. The apparatus of claim 28, wherein the at least one of the beam indication or the PL-RS is indicated in the group common DCI for each UE of the set of UEs when the at least one ID is UE specific, the set of UEs corresponding to the at least one ID.

35. The apparatus of claim 28, wherein the beam indication for each different channel or for a set of channels is indicated by a different radio network temporary identifier (RNTI).

36. The apparatus of claim 35, wherein the beam indication for the each different channel or for the set of channels is further indicated through a radio resource control (RRC) configuration.

* * * * *